(12) United States Patent
Gotzmann et al.

(10) Patent No.: US 10,327,047 B2
(45) Date of Patent: Jun. 18, 2019

(54) DISTRIBUTION FRAME DEVICE FOR COMMUNICATIONS AND DATA TECHNOLOGY

(71) Applicant: CommScope Technologies LLC, Hickory, NC (US)

(72) Inventors: Andreas Gotzmann, Berlin (DE); Sven Schümann, Berlin (DE); Carsten Storbeck, Stahnsdorf (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/531,103

(22) PCT Filed: Nov. 25, 2015

(86) PCT No.: PCT/US2015/062751
§ 371 (c)(1),
(2) Date: May 26, 2017

(87) PCT Pub. No.: WO2016/086174
PCT Pub. Date: Jun. 2, 2016

(65) Prior Publication Data
US 2017/0332152 A1  Nov. 16, 2017

(30) Foreign Application Priority Data
Nov. 27, 2014 (DE) .......... 10 2014 224 289

(51) Int. Cl.
*H04Q 1/14* (2006.01)
*H04Q 11/00* (2006.01)
(Continued)

(52) U.S. Cl.
CPC ....... *H04Q 1/14* (2013.01); *H04Q 2011/0007* (2013.01)

(58) Field of Classification Search
CPC . H04Q 2011/00074; H04Q 2011/0007; H04Q 1/14
(Continued)

(56) References Cited

U.S. PATENT DOCUMENTS

| 2003/0123648 A1* | 7/2003 | Ashton ................ H04B 10/27 379/403 |
| 2003/0128983 A1* | 7/2003 | BuAbbud ........ H04B 10/25751 398/71 |

(Continued)

FOREIGN PATENT DOCUMENTS

| CA | 2 331 549 A1 | 7/2002 |
| DE | 33 34 987 A1 | 5/1984 |

(Continued)

OTHER PUBLICATIONS

International Search Report and Written Opinion of the International Searching Authority for corresponding International Patent Application No. PCT/US2015/062751 dated Apr. 1, 2016, 10 pgs.
(Continued)

*Primary Examiner* — Oommen Jacob
(74) *Attorney, Agent, or Firm* — Merchant & Gould P.C.

(57) ABSTRACT

The invention relates to a distribution frame device (1) for communications and data technology for switching over at least one electrical subscriber line (2) from a first service to a second service, wherein the distribution frame device (1) has a connection technology (3) for the electrical subscriber lines (2), a connection technology (4) for the electrical lines (5) of the first service and a connection technology (6) for optical fibers of the second service, wherein the distribution frame device (1) further has an active technology with at least one converter (14) for converting optical signals into electrical signals and vice versa for the second service, wherein a connection for optical fibers and a connection for electrical lines are associated with the at least one converter
(Continued)

(14), wherein the distribution frame device (1) has means by means of which the connection technology (3) of the subscribers can selectively be connected to the connection technology (4) of the first service or to the associated electrical connection of the converter (14).

14 Claims, 4 Drawing Sheets (51) Int. Cl.
*H04B 10/00* (2013.01)
*G02B 6/36* (2006.01)
*H04B 10/25* (2013.01)

(58) Field of Classification Search
USPC .................................................. 398/43, 45
See application file for complete search history.

(56) References Cited

U.S. PATENT DOCUMENTS

| | | | |
|---|---|---|---|
| 2004/0175077 A1* | 9/2004 | Weber | H04J 14/02 385/88 |
| 2006/0023756 A1* | 2/2006 | Meier | H04L 12/2801 370/537 |
| 2006/0153516 A1 | 7/2006 | Napiorkowski et al. | |
| 2006/0159462 A1* | 7/2006 | Aronson | H04B 10/2513 398/138 |
| 2006/0230425 A1* | 10/2006 | Shani | H04N 7/17309 725/117 |
| 2007/0047721 A1 | 3/2007 | Kennedy | |
| 2008/0219282 A1* | 9/2008 | Adomeit | H04M 1/738 370/420 |
| 2008/0267554 A1* | 10/2008 | Thompson | H01R 4/2433 385/2 |
| 2009/0003792 A1* | 1/2009 | Thompson | G02B 6/4452 385/135 |
| 2010/0020789 A1* | 1/2010 | Mueller | H04M 11/062 370/352 |
| 2011/0026930 A1* | 2/2011 | Cui | H04B 10/272 398/115 |
| 2014/0186023 A1* | 7/2014 | Louderback | H04B 10/077 398/16 |
| 2015/0207563 A1* | 7/2015 | Cho | H04J 14/02 398/79 |
| 2017/0332152 A1* | 11/2017 | Gotzmann | H04Q 1/14 |

FOREIGN PATENT DOCUMENTS

| | | |
|---|---|---|
| DE | 103 57 468 A1 | 6/2005 |
| WO | 02/45383 A2 | 6/2002 |
| WO | 02/058405 A2 | 7/2002 |
| WO | 03/007625 A1 | 1/2003 |
| WO | 2006/065573 A1 | 6/2006 |
| WO | 2013/189616 A1 | 12/2013 |

OTHER PUBLICATIONS

Extended European Search Report for corresponding European Patent Application No. 15862491.6 dated Jun. 25, 2018, 7 pages.

* cited by examiner

DISTRIBUTION FRAME DEVICE FOR COMMUNICATIONS AND DATA TECHNOLOGY

CROSS-REFERENCE TO RELATED APPLICATION

This application is being filed on Nov. 25, 2015 as a PCT International Patent Application and claims the benefit of German Patent Application No. 102014224289.4, filed on Nov. 27, 2014, the disclosure of which is incorporated herein by reference in its entirety.

BACKGROUND

The invention relates to a distribution frame device for communications and data technology.

There is a continuous desire for more bandwidth in communications and data technology. This leads to an increased use of glass fibres. However, this requires considerable investment, in particular if the glass fibres are intended to be routed as far as the subscriber. This is known by the term "Fibre To The Home" (FTTH). In order to reduce the investment costs in new infrastructures, an attempt is therefore made to utilize the existing infrastructure as far as possible.

One approach which has long been known is DSL technology by means of which broadband signals can be transmitted via the subscriber times which are usually in the form of twisted twin cores. In this case, a subscriber can switch from a standard service (for example plain old telephone service POTS) to a DSL service for a fee.

A more recent approach is what is known as G.fast technology in which even more bandwidth can be transmitted, but wherein the active technology has to move even closer to the subscriber on account of the damping. In this case, a glass fibre cable is routed to the active technology, the optical signals are converted into electrical signals there and transmitted to the subscriber via the existing subscriber lines.

WO 2013/189616 A1 discloses a distribution frame connection module for telecommunications and data technology, comprising an enclosure, wherein electrical input and output contacts, which are in the form of core connection contacts, are arranged in the enclosure, wherein an input contact is in each case electrically connected to an output contact, wherein functional elements, which are electrically connected to the output contacts, are arranged in the enclosure. In this case, the input contacts and the output contacts are electrically and mechanically connected by means of interface contacts, wherein the input contacts are arranged in a base module and the output contacts are arranged in at least two submodules, wherein the submodules can be connected or disconnected from one another independently of the base module.

SUMMARY

The invention is based on the technical problem of providing a distribution frame device for switching over at least one electrical subscriber line from a first service to a second service, the said distribution frame device also being suitable for G.fast technology.

The distribution frame device for switching over at least one electrical subscriber line from a first service to a second service has a connection technology for the electrical subscriber lines, a connection technology for the electrical lines of the first service and a connection technology for optical fibres of the second service. It should be noted here that the subscriber line for a subscriber is preferably a dual-core line which is further preferably in the form of a twisted twin core. In principle, the distribution frame device can be equipped for only one single subscriber. However, more subscribers (for example 4 or 8 subscribers) are preferably supplied with messages by the distribution frame device. It should further be noted that the term "optical fibre" is intended to be understood generally as an optical waveguide in the text which follows. The distribution frame device further has at least one converter for converting optical signals into electrical signals and vice versa for the second service, wherein a connection for optical fibres and a connection for electrical lines are associated with the at least one converter. If, accordingly, more subscribers are to be supplied, more converters are accordingly required. In this case, the number of converters may be less than, equal to or greater than the number of subscribers which are connected via the electrical lines. Furthermore, the distribution frame device has means by means of which the connection technology of the subscribers can selectively be connected to the connection technology of the first service or to the associated electrical connection of the converter.

Various embodiments are possible in respect of the design of the means. For example, switchover can be performed by manual jumpering between the connections. As an alternative, switchover means, for example relays, which are driven by remote data transmission can be provided. In this case, provision may be made for the switchover signals to be transmitted from the system side or from the subscriber side.

The connection technology for the optical fibres is preferably in the form of a splicing cassette, wherein the number of incoming fibres can be greater than the number of converters, this being explained in greater detail below. The connection for the optical fibres on the converter itself is preferably in the form of an adapter for receiving an optical plug (for example SC plugs). The incoming fibres are then spliced, for example, with pigtails in the splicing cassette, the plugs of the said pigtails then being inserted into the respective adapters as connections to the converter. However, other optical connections are also possible.

The active technology has to be supplied with voltage. In this case, the voltage is supplied to the active technology via at least one subscriber line or via at least one electrical line of the first service or via a separate cable, wherein there is preferably an option to choose. Supply via a separate cable from the system side preferably takes place when there is already a suitable supply cable in the region of the distribution frame device, it then being possible for said supply cable to be routed to the distribution frame device together with the optical fibres without problems. In this case, the supply cable can be routed with the optical fibres in a common cable or separate cables. As an alternative, in the case of supply from the subscriber side, a separate cable can likewise be used. However, the subscriber lines are preferably used for supplying voltage. In this case, it is sufficient, in principle, to provide the voltage supply via a subscriber line. However, when there are several subscribers which are connected to the active technology, the supply voltage is preferably provided via all of the subscriber lines. The voltage components on the individual subscriber lines can then be combined and supplied to the active technology in one module. The designs in respect of the subscriber lines can be transferred to the voltage supply via the electrical lines of the first service.

In a further embodiment, the distribution frame device has at least one connection for an optical connection to a subscriber (Fibre To The Home FTTH). This allows a further upgrade of a subscriber. In this case, an incoming fibre can be spliced in a splicing cassette and the connection to the connection can be established by means of another fibre. The connection is preferably designed for exterior conditions (often also called "hardened connector"). It goes without saying that several connections for FTTH can also be provided. In this case, provision may also be made for one or more incoming fibres to initially be connected to an optical splitter after splicing, the output fibres of said optical splitter then being connected to the connections for FTTH. As a result, more subscribers can be supplied with FTTH at a reduced bandwidth (on account of the distribution in the splitter). In this case, provision may also be made for several fibres to be routed out of the distribution frame device together as a cable.

In principle, the entire distribution frame device can be arranged in an enclosure which is in the form of a sleeve or box for example. The distribution frame device preferably has at least two enclosures, wherein the active technology is arranged in a first enclosure and the electrical connection technology for the subscribers is arranged in a second enclosure. This allows more degrees of freedom when dissipating the heat lost from the active technology. If optical splitters are used, the said optical splitters can be arranged in the first enclosure, in the second enclosure or a separate third enclosure.

In a further embodiment, the connection technology for the electrical subscriber lines and/or the connection technology for the electrical lines of the first service and/or the electrical connection to the converter or to the converters are/is in the form of a distribution frame connection module, wherein the distribution frame connection module has a base module with first contacts and at least two submodules with second contacts, wherein the submodules can be connected or disconnected from one another independently of the base module. A distribution frame connection module as disclosed in WO 2013/189616 A1 is preferably used in this case, wherein reference is expressly made to the disclosure content of the said application.

The submodules preferably each have two contacts, so that a twin core is connected in each case. The advantage is that, in the event of jumpering work for one subscriber, this does not have any repercussions for the other subscribers. It goes without saying that the same also applies when replacing defective submodules or submodules with a different functionality. Therefore, functional elements can be arranged in the submodules. The functional elements may be, for example, overvoltage protection elements, filter circuits, relays, splitters or bridges. In the case of specific functional elements however, the submodule has more than two contacts. If the functional element is a relay for example, the submodule has four contacts on the subscriber side. In this case, the submodule is therefore preferably associated with precisely one subscriber, wherein the submodule has as many contacts as are necessary for the functional elements of the subscriber.

A wide variety of embodiments are possible in respect of interconnection in this case. For example, at least a first and at least a second distribution frame module exist. In this case, the electrical lines of the first service are connected to the contacts of the base module of the first distribution frame connection module. The electrical subscriber lines are connected to the contacts of the base module of the second distribution frame connection module. For the purpose of forwarding the signals of the first service to the subscriber, a submodule of the first distribution frame connection module is connected to a submodule of the second distribution frame connection module. In this case, the two submodules operate in the manner of a patch cable. If the subscriber is now intended to be connected to the second service, the submodule is drawn into the first distribution frame connection module and plugged into a receptacle for a submodule on the converter.

Instead of a jumpering matrix of this kind, provision may also be made for the electrical lines of the first service to be connected to the contacts of the base module of the distribution frame connection module, wherein at least one line of the subscriber and a line for connection of the converter are arranged on a submodule, wherein a contact of the submodule can be connected to another contact of the submodule by means of a functional element. The functional element may be, for example, a relay which then selectively connects the subscriber line to the contact of the base module (that is to say to the first service) or to the connection on the converter. In this embodiment, the submodule can have, for example, four contacts, and therefore a twin core from the connection of the converter can be connected to a twin line of the subscriber.

By way of example, an interconnection where the electrical lines of the first service are connected to the contacts of the base module of at least one first distribution frame connection module and the electrical lines are routed from the connections of the converter to the contacts of the base module of at least one second distribution frame connection module is also possible. The electrical lines of the subscribers are connected to submodules which, depending on which service is intended to be selected, are plugged into the first or the second distribution frame connection module.

Finally, interconnection where the switchover takes place in the converter or, more precisely, in a DSLAM as the active technology with the converter is also possible. In this case, the electrical lines are routed to a base module of at least one first distribution frame connection module. Lines are then routed from the submodules of the first distribution frame connection module to the DSLAM. Electrical lines are then routed back from the DSLAM to a base module of at least one second distribution frame connection module, and the subscriber lines are connected to the submodules of the second distribution frame connection module. That is to say, the lines of the first service are completely connected through to the DSLAM. Then, either the line of the first service is connected through or switched over to an electrical connection of the converter by means of switchover devices in the DSLAM. Since, in this embodiment, switchover takes place solely in the DSLAM, the distribution frame connection modules can also simply be in the form of conventional connection modules.

In a further embodiment, the active technology has at least one printed circuit board holder for at least one printed circuit board, wherein the connection for the optical fibres and the connection for the electrical lines are arranged on the printed circuit board holder, wherein the printed circuit board is fastened in the printed circuit board holder by means of a plug connection. This allows the printed circuit boards to be easily inserted and replaced.

In a further embodiment, a large number of converters are provided, wherein a switchover matrix is provided between the electrical connections of the converters and the connection technology for the subscribers, the said switchover matrix being designed in such a way that the signal channels of the converters can be changed at a transfer point in front of the connection technology of the subscriber.

This allows, for example, eight channels to be provided by the converter, wherein only six subscribers are intended to be operated. If, for example, a printed circuit board in the active technology now fails, the subscriber can be switched to one of the two free channels by the switchover matrix.

BRIEF DESCRIPTION OF THE DRAWINGS

The invention will be explained in greater detail below with reference to preferred exemplary embodiments. In the figures.

DETAILED DESCRIPTION

Figure 1:
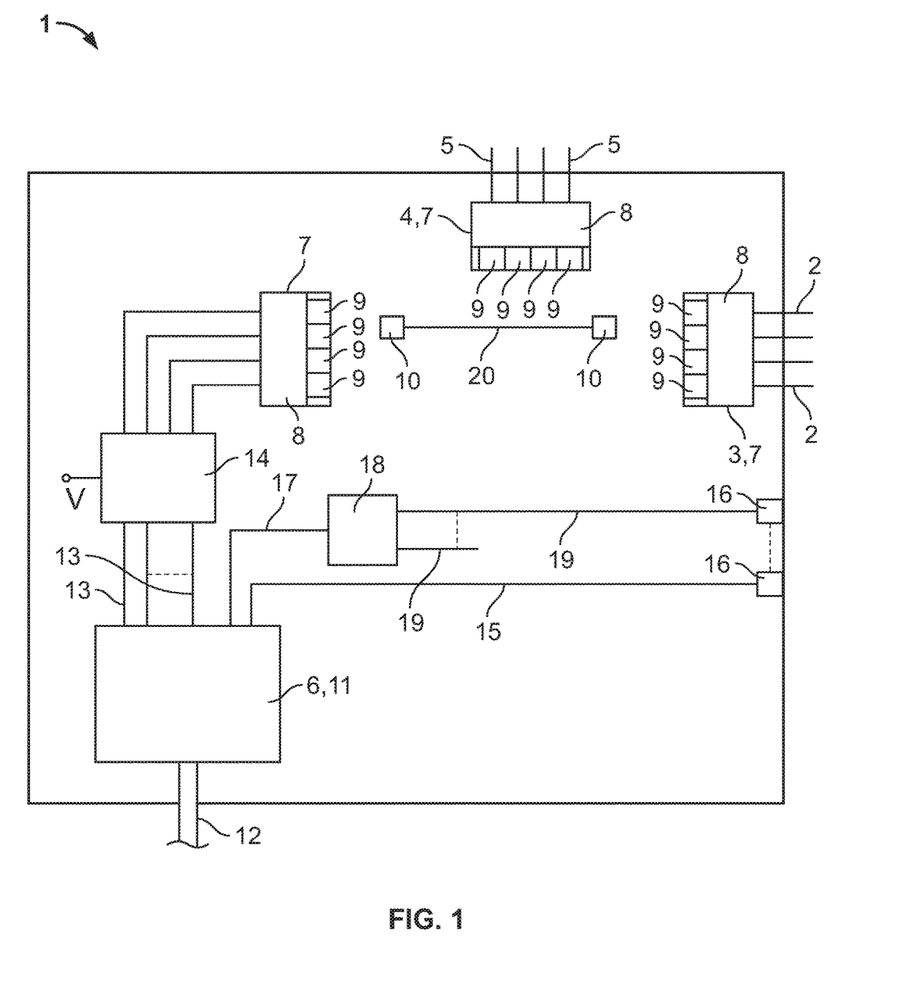
FIG. 1 shows a schematic block diagram of a distribution frame device.

FIG. 1 illustrates a schematic block diagram of a distribution frame device 1 for switching over at least one electrical subscriber line 2 from a first service to a second service and vice versa. The distribution frame device 1 has a connection technology 3 for the electrical subscriber lines 2, a connection technology 4 for the electrical lines 5 of the first service and a connection technology 6 for optical fibres of the second service. The connection technologies 3, 4 are each preferably at least in the form of a distribution frame connection module 7, wherein the distribution frame connection module 7 has a base module 8 with first contacts. The base module 8 has receptacles 9 for receiving at least two submodules 10 with second contacts which will be explained in greater detail below. In the illustrated example, the base modules 8 have four receptacles 9, wherein this number can be eight or ten receptacles 9 when implemented in practice. The connection technology 6 for the optical fibres of the second service is preferably in the form of a splicing cassette 11, wherein the optical fibres of the second service, preferably in the form of glass fibre cables 12, are routed to the distribution frame device 1. In the said distribution frame device, the optical fibres are separated and spliced, for example, with pigtail cables 13 in the splicing cassette 11. The pigtail cables 13 are then each connected to a converter 14 which converts optical signals into electrical signals and vice versa. In this case, the converters 14 are preferably each arranged on a printed circuit board. The converters 14 will be discussed only in the singular in the text which follows. In this case, the converter 14 is an active technology and therefore requires an electrical supply voltage V. In this case, the supply voltage V can be routed to the distribution frame device 1 via a separate cable together with the glass fibre cable 12, or else from the subscriber side. In this case, provision may be also made for the supply voltage to be provided via the subscriber lines 2, wherein the supply voltage potentials of the individual subscriber lines 2 are then combined and routed to the converter 14. In this case, it is not necessary for all of the optical fibres of the glass fibre cable 12 to be routed to the converter 14. At least one optical fibre of the glass fibre cable 12 is preferably spliced with an optical fibre 50 which is then routed to a plug 16. In this case, the plug 16 is preferably suitable for exterior applications. A Fibre To The Home (FTTH) service can then be offered by means of the plug 16. As an alternative or in addition to the optical fibres 15, at least one optical fibre of the glass fibre cable 12 can also be spliced with at least one optical fibre 17 which is then routed to a preferably passive optical splitter 18. In the said optical splitter, the optical signals of the optical fibres 17 are divided between several output fibres 19 which are then each terminated with a plug 16, wherein only one further plug 16 is illustrated for reasons of clarity. This also constitutes an FTTH service with a reduced power level since the bandwidth is divided between several output fibres 19.

The converter 14 has connections, not illustrated, for the pigtail cables 13, the said connections being in the form of, for example, couplings or adapters in order to receive the plugs of the pigtail cables 13. A distribution frame connection module 7 having a base module 8 with receptacles 9 for submodules 10 is arranged on the electrical side. Two submodules 10 which are connected to one another via connecting lines 20 are shown between the distribution frame connection modules 7. Each submodule 10 preferably has two contacts for connecting a twin core, and therefore the connecting lines 20 are then also designed as twin cores. In this case, the right-hand side submodule 10 is inserted into a receptacle 9 of the distribution frame connection module 7 for the subscriber lines 2, wherein an electrical connection to the contacts in the base module 8 is established via suitable interface contacts. Depending on whether the subscriber desires the first service or the second service, the left-hand side submodule 10 is inserted into the receptacle 9 of the distribution frame connection module 7 for the electrical lines 5 of the first service or into a receptacle 9 in the distribution frame connection module 7 which is associated with the converter 14. This constitutes manual switchover.

However, the distribution frame device 1 can also implement the switchover by means of an external switchover signal. In this case, the switchover can take place in the submodules 10 or be moved to the active technology.

Figure 2:
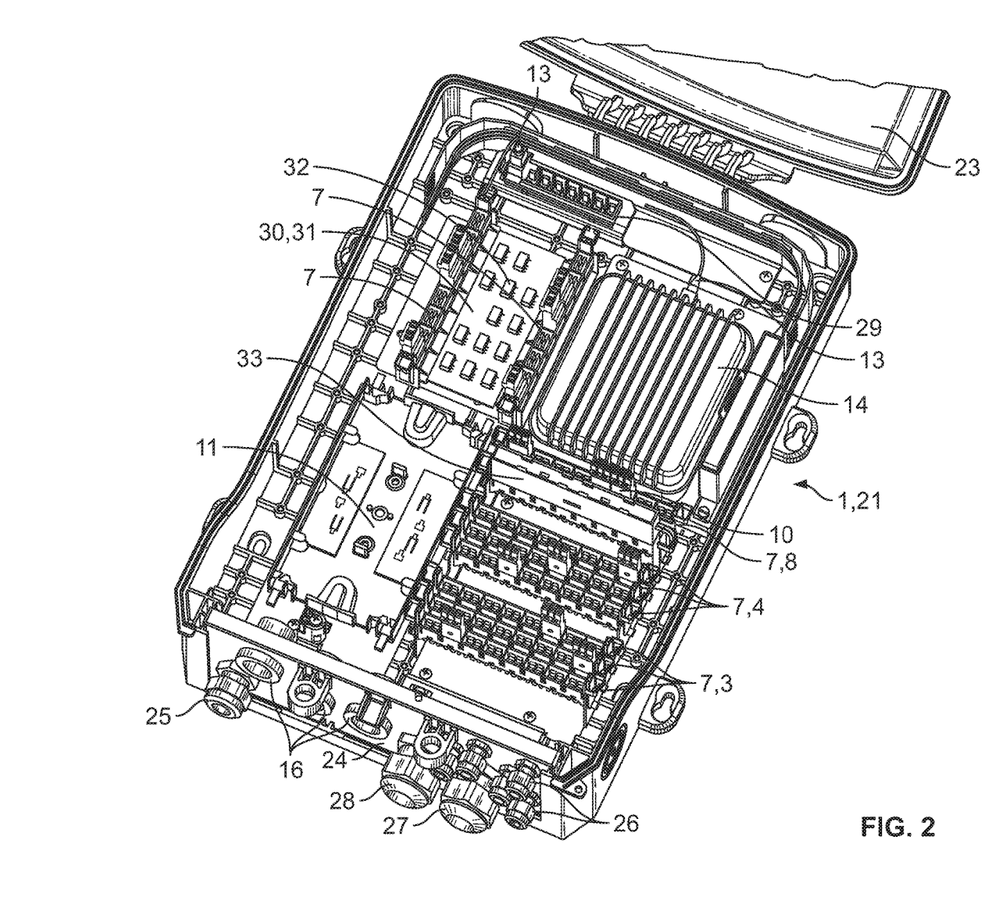
FIG. 2 is a perspective illustration of a distribution frame device in a first embodiment.
Figure 3:
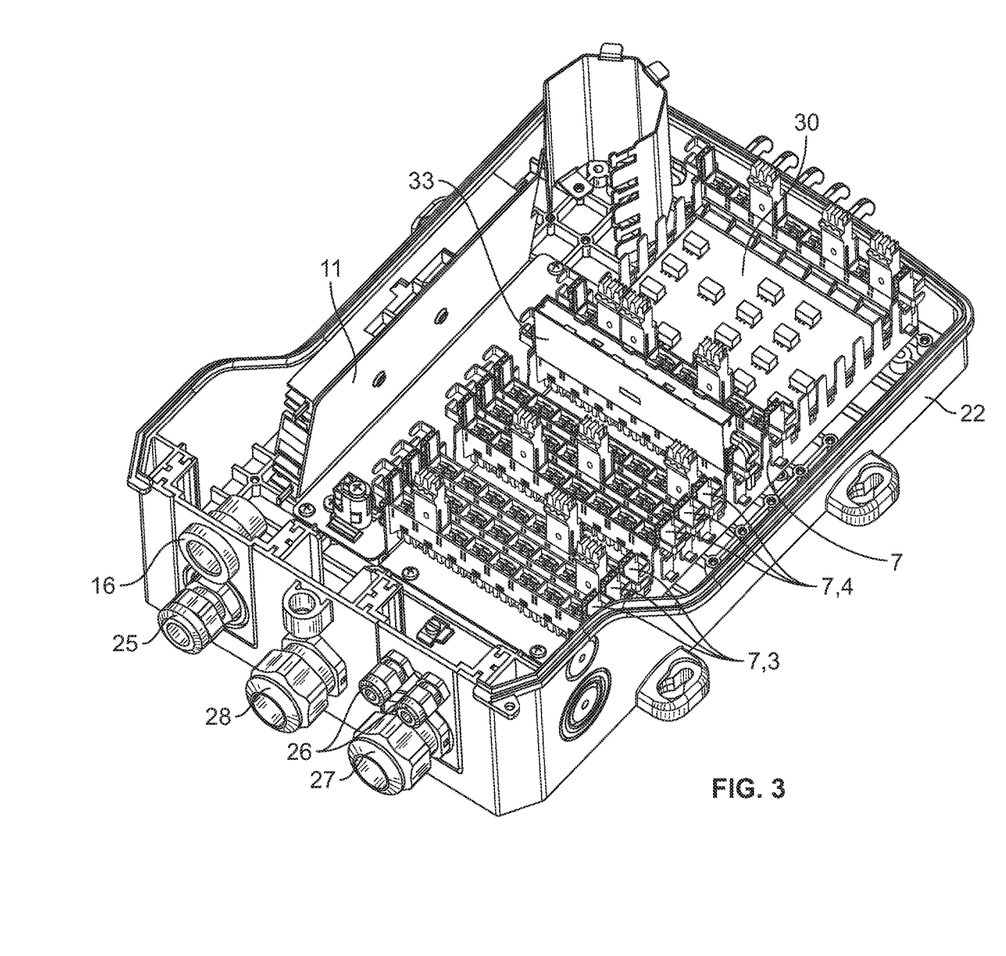
FIG. 3 is a perspective illustration of a portion of the distribution frame device in a second embodiment.

FIG. 2 illustrates an embodiment of a distribution frame device 1. The distribution frame device 1 has a box 21 with a lower part 22 and a cover 23, only partially illustrated, wherein the cover 23 is fastened to the lower part 22 in a pivotable manner. A connection 25 for the glass fibre cable 12, three plugs 16 for FTTH connections, connections 26 for the subscriber lines 2, a connection 27 for the electrical lines 5 of the first service and a connection 28, of which the function will be explained in greater detail below with reference to FIG. 3, are present on an end face 24 of the lower part 22. It should be noted here that the connections 27 and 28 can also be interchanged. The splicing cassette 11 and the converter 14 are arranged in the lower part 22. In this case, the converter 14 is illustrated with a separate enclosure by the printed circuit boards being arranged in a printed circuit board holder.

The said FIG. 2 illustrates how a pigtail cable 13 is inserted into an adapter of the converter 14. An adapter strip 29 is arranged above the converter 14, a further pigtail cable 13 being illustrated as being inserted in the said adapter strip. In this case, the adapter strip 29 represents a kind of parking position for the pigtail cables 13 arriving from the splicing cassette 11 which are not yet intended to be inserted into the converter 14. A first distribution frame connection module 7 is arranged below the converter 14, the electrical outputs of the converter 14 being connected to the base module 8 of the said first distribution frame connection module, wherein jumpering can be performed by means of the submodules 10. A switchover matrix 30 is additionally illustrated in the box 21, the said switchover matrix having a respective distribution frame connection module 7 on the left-hand side and on the right-hand side, a printed circuit board 31 with switchover elements 32 (for example relays) being arranged between the said distribution frame connection modules. In this case, the base modules 8 of the two distribution frame connection modules 7 are connected to one another by means of the printed circuit board 31 and the switchover elements 32, wherein the assignment in respect of which contacts of the left-hand side distribution frame connection module 7 are connected to which contacts of the right-hand side distribution frame connection module 7 can be changed by means of the switchover elements 32. This switchover can be performed, for example, via a control line, not illustrated.

A special distribution frame connection module 33 is arranged below the distribution frame connection module 7 of the converter 14, the said special distribution frame connection module serving to provide the supply voltage for the active technology (that is substantially of the converter 14). To this end, the supply voltage is transmitted, for example, via the electrical lines 5 of the first service, wherein the DC voltage potentials of all of the electrical lines 5 are combined in the distribution frame connection module 33 and this combined item is routed to the converter 14.

Finally, the connection technology 3 for the electrical subscriber lines 2 and the connection technology 4 for the electrical lines 5 of the first service, which connection technologies each have three distribution frame connection modules 7, are further arranged in the box 21. In this case, the positions of the connection technology 3 and the connection technology 4 can also be interchanged. An electrical line 5 of the first service or an electrical line from the switchover matrix 30, that is to say an electrical signal from the second service, can then be connected to the subscriber lines 2 via the submodules 10.

It should be noted here that the distribution frame device 1 is of modular construction in the illustrated example. If, for example, the functionality of the switchover matrix 30 is not required, the said switchover matrix can be simply removed and the electrical signals from the converter 14 can be jumpered directly from the associated distribution frame connection module 7 to the connection technology 3.

If this modularity is not required, individual distribution frame connection modules 7 can be fused to one another, this accordingly saving installation space.

FIG. 3 illustrates an alternative design, wherein identical elements are provided with the same reference symbols. The essential difference from the embodiment according to FIG. 2 is that the entire distribution frame device 1 is not arranged in the box 21. Instead, the converter 14 in particular is removed. The optical fibres which are spliced in the splicing cassette 11 are routed out of the box 21 to the active technology or converter 14 by means of the connection 28 in this case. In addition to the optical fibres, an electrical cable is also routed from the distribution frame connection module 33 out of the box 21 to the active technology via the connection 28 in order to supply the said active technology with voltage. As an alternative, a common hybrid cable can also be used. Finally, electrical lines are also routed from the converter 14 back into the box 21 by means of the connection 28 and, for example, connected to the connection technology 3. In this case, the advantage of this embodiment is that heat dissipation is not important since the active technology is removed, and therefore the box 21 can be of very compact construction.

Figure 4:
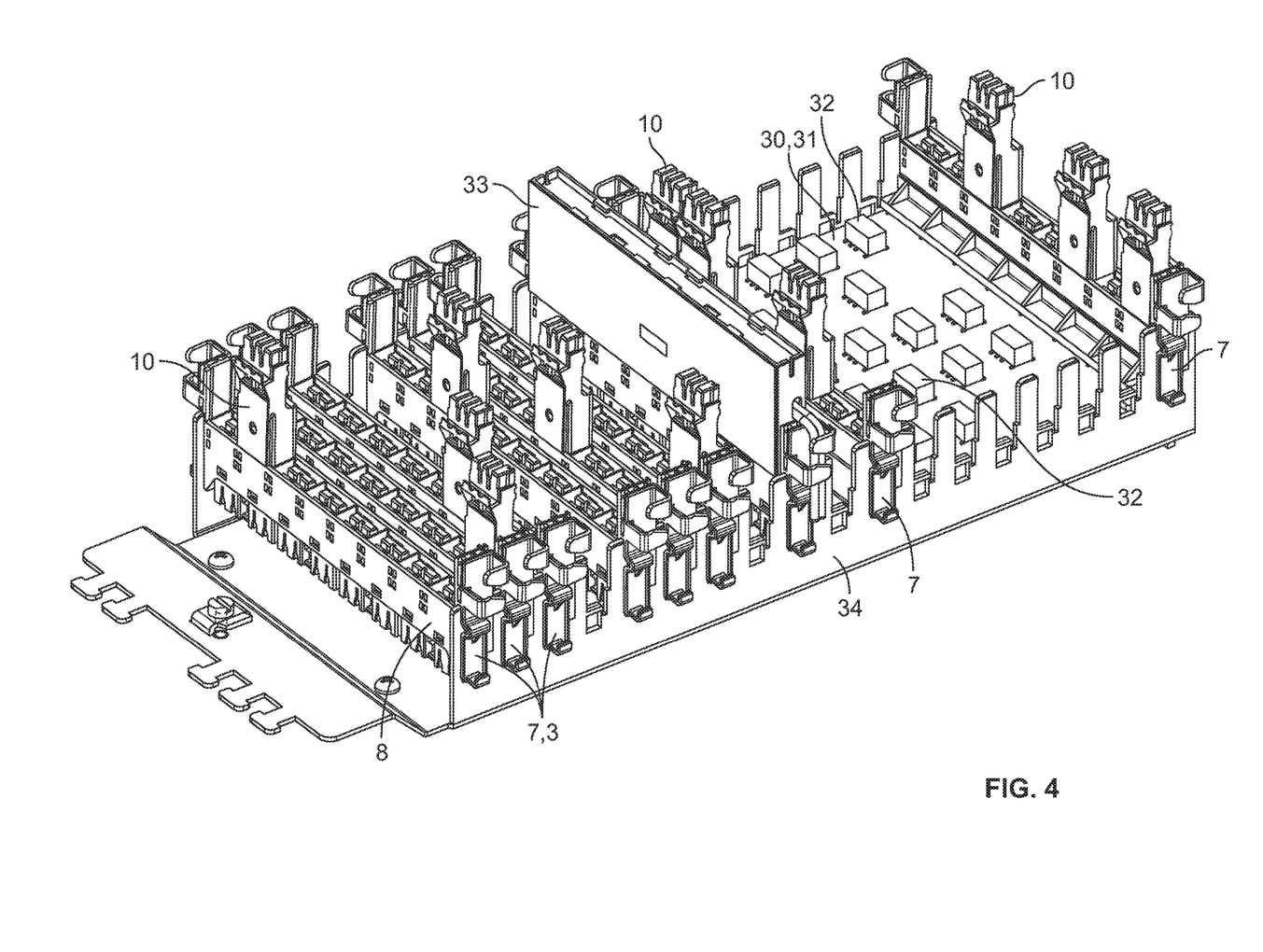
FIG. 4 is a perspective illustration of a switchover matrix.

Finally, FIG. 4 illustrates the electrical assembly in line with the embodiment according to FIG. 3 which is mounted on a common backmount frame 34.

LIST OF REFERENCE SYMBOLS

1 Distribution frame device
2 Subscriber line
3 Connection technology (for the electrical subscriber lines)
4 Connection technology (for the electrical lines of the first service)
5 Electrical lines of the first service
6 Connection technology (for optical fibres)
7 Distribution frame connection module
8 Base module
9 Receptacles
10 Submodule
11 Splicing cassette
12 Glass fibre cable
13 Pigtail cable
14 Converter
15 Optical fibre (FTTH)
16 Plug (FTTH)
17 Optical fibre
18 Optical splitter
19 Output form
20 Connecting lines (between submodules)
21 Box
22 Lower part
23 Cover
24 End face
25 Connection
26 Connection
27 Connection
28 Connection
29 Adapter strip
30 Switchover matrix
31 Printed circuit board
32 Switchover element
33 Distribution frame connection module
34 Backmount frame

What is claimed is:

1. A distribution frame device for communications and data technology for switching over at least one electrical subscriber line from a first service to a second service, the distribution frame device comprising:
 a first connection technology for the at least one electrical subscriber line;
 a second connection technology for electrical lines of the first service;
 a third connection technology for optical fibres of the second service; and
 an active technology with at least one converter for converting optical signals into electrical signals and vice versa for the second service, the at least one converter including a first connection for optical fibres and a second connection for electrical input/output signals;
 wherein the first connection technology can selectively be connected to the second connection technology or to the at least one converter second connection;
 wherein the first connection technology and/or the second connection technology and/or the converter second connection are/is in the form of a distribution frame connection module, wherein the distribution frame connection module has a base module with first contacts and at least two submodules with second contacts, wherein the submodules can be connected or disconnected from one another independently of the base module.

2. The distribution frame device according to claim 1, wherein voltage is supplied to the active technology via the at least one electrical subscriber line, at least one of the electrical lines of the first service, or a separate cable.

3. The distribution frame device according to claim 1, wherein the distribution frame device has at least one connection for an optical connection to a subscriber.

4. The distribution frame device according to claim 1, wherein the distribution frame device has at least two enclosures, wherein the active technology is arranged in a first enclosure and the electrical connection technology for the subscribers is arranged in a second enclosure.

5. The distribution frame device according to claim 1, wherein the submodules are each associated with precisely one subscriber.

6. The distribution frame device according to claim 1, wherein at least one functional element is arranged in the submodule.

7. A The distribution frame device for communications and data technology for switching over at least one electrical subscriber line from a first service to a second service, the distribution frame device comprising:
- a first connection technology for the at least one electrical subscriber line;
- a second connection technology for electrical lines of the first service;
- a third connection technology for optical fibres of the second service; and
- an active technology with at least one converter for converting optical signals into electrical signals and vice versa for the second service, the at least one converter including a first connection for optical fibres and a second connection for electrical input/output signals;
- wherein the first connection technology can selectively be connected to the second connection technology or to the at least one converter second connection;
- wherein the active technology has at least one printed circuit board holder for at least one printed circuit board, wherein the first and second connections are arranged on the at least one printed circuit board holder, wherein the at least one printed circuit board is fastened in the at least one printed circuit board holder by means of a plug connection.

8. A distribution frame device for communications and data technology for switching over at least one electrical subscriber line from a first service to a second service, the distribution frame device comprising:
- a first connection technology for the at least one electrical subscriber line;
- a second connection technology for electrical lines of the first service;
- a third connection technology for optical fibres of the second service; and
- an active technology with at least one converter for converting optical signals into electrical signals and vice versa for the second service, the at least one converter including a first connection for optical fibres and a second connection for electrical input/output signals;
- wherein the first connection technology can selectively be connected to the second connection technology or to the at least one converter second connection;
- wherein a multiple number of converters is provided, wherein a switchover matrix is provided between the second connections of the converters and the first connection technology, the switchover matrix being designed in such a way that signal channels of the converters can be changed at a transfer point in front of the first connection technology.

9. The distribution frame device according to claim 7, wherein voltage is supplied to the active technology via the at least one electrical subscriber line, at least one of the electrical lines of the first service, or a separate cable.

10. The distribution frame device according to claim 7, wherein the distribution frame device has at least one connection for an optical connection to a subscriber.

11. The distribution frame device according to claim 7, wherein the distribution frame device has at least two enclosures, wherein the active technology is arranged in a first enclosure and the electrical connection technology for the subscribers is arranged in a second enclosure.

12. The distribution frame device according to claim 8, wherein voltage is supplied to the active technology via the at least one electrical subscriber line, at least one of the electrical lines of the first service, or a separate cable.

13. The distribution frame device according to claim 8, wherein the distribution frame device has at least one connection for an optical connection to a subscriber.

14. The distribution frame device according to claim 8, wherein the distribution frame device has at least two enclosures, wherein the active technology is arranged in a first enclosure and the electrical connection technology for the subscribers is arranged in a second enclosure.

* * * * *